US008394154B2

(12) United States Patent
You et al.

(10) Patent No.: US 8,394,154 B2
(45) Date of Patent: Mar. 12, 2013

(54) COUNTER-CURRENT OXIDATION AND STEAM METHANE REFORMING PROCESS AND REACTOR THEREFOR

(75) Inventors: Lixin You, Sugar Land, TX (US); Curtis Krause, Houston, TX (US); Kevin Nguyen, Missouri City, TX (US); Amanda Vincent, Houston, TX (US)

(73) Assignee: Texaco Inc., San Ramon, CA (US)

( * ) Notice: Subject to any disclaimer, the term of this patent is extended or adjusted under 35 U.S.C. 154(b) by 1349 days.

(21) Appl. No.: 11/966,696

(22) Filed: Dec. 28, 2007

(65) Prior Publication Data

US 2009/0165385 A1 Jul. 2, 2009

(51) Int. Cl.
*C10J 3/46* (2006.01)
*B01J 8/00* (2006.01)

(52) U.S. Cl. ........ 48/197 R; 48/61; 48/127.9; 48/127.1; 48/198.6; 48/198.7; 48/198.8; 48/199 R; 48/203; 48/206; 48/214 R; 48/214 A; 48/76; 422/187; 422/625; 422/629; 422/650; 422/198; 422/643; 60/780; 252/376; 252/373

(58) Field of Classification Search ............... 48/127.1, 48/127.9, 61; 422/190, 195, 198, 200, 204, 422/205, 629

See application file for complete search history.

(56) References Cited

U.S. PATENT DOCUMENTS

| 4,238,204 A | 12/1980 | Perry |
| 4,690,695 A | 9/1987 | Doshi |
| 4,973,453 A | 11/1990 | Agee |
| 5,252,613 A | 10/1993 | Chang et al. |
| 5,256,174 A | 10/1993 | Kai et al. |
| 5,348,982 A | 9/1994 | Herbolzheimer et al. |
| 5,435,836 A | 7/1995 | Anand et al. |
| 5,609,834 A * | 3/1997 | Hamada et al. ............... 422/625 |
| 5,669,960 A | 9/1997 | Couche |
| 5,741,474 A | 4/1998 | Isomura et al. |
| 5,753,010 A | 5/1998 | Sircar et al. |
| 6,063,161 A | 5/2000 | Keefer et al. |
| 6,130,259 A | 10/2000 | Waycuilis |
| 6,322,755 B1 | 11/2001 | Hoek et al. |
| 6,406,523 B1 | 6/2002 | Connor et al. |
| 6,471,744 B1 | 10/2002 | Hill |
| 6,479,557 B1 | 11/2002 | Lange et al. |
| 6,767,389 B2 | 7/2004 | Edlund et al. |

(Continued)

FOREIGN PATENT DOCUMENTS

| EP | 0 592 176 A1 | 4/1994 |
| WO | WO 00/01613 A1 | 1/2000 |

(Continued)

OTHER PUBLICATIONS

Fierro et al., "Oxidative reforming of biomass derived ethanol for hydrogen production in fuel cell applications", 75 Catalysis Today (2002), pp. 141-144.
Cavallaro et al., "Hydrogen production by auto-thermal reforming of ethanol on Rh/Al2O3 catalyst", 123 J. Power Sorces (2003), pp. 10-16.

(Continued)

*Primary Examiner* — Kaity V. Handal
(74) *Attorney, Agent, or Firm* — Melissa Patangia; Christopher D. Northcutt; Gregory L. Porter

(57) ABSTRACT

A process for preparation of synthesis gas and/or hydrogen by counter-currently providing an oxidation reactant stream through an oxidation chamber and a reforming reactant stream through a steam reforming chamber is described. Also provided is a reactor for conducting the reaction.

33 Claims, 7 Drawing Sheets

U.S. PATENT DOCUMENTS

| | | | |
|---|---|---|---|
| 6,796,332 B1 | 9/2004 | Nguyen et al. | |
| 6,818,198 B2 | 11/2004 | Singh et al. | |
| 6,878,362 B2 | 4/2005 | Kumar et al. | |
| 6,939,999 B2 | 9/2005 | Abazajian et al. | |
| 7,005,113 B2 | 2/2006 | Edlund et al. | |
| 7,108,835 B2 | 9/2006 | Hawthorne et al. | |
| 7,195,663 B2 | 3/2007 | Edlund et al. | |
| 7,662,350 B2* | 2/2010 | Lee et al. | 422/202 |
| 8,029,580 B2* | 10/2011 | Kim et al. | 48/61 |
| 2003/0044331 A1 | 3/2003 | DeBellis et al. | |
| 2003/0053941 A1* | 3/2003 | Wolfsteiner | 422/211 |
| 2003/0223931 A1 | 12/2003 | Narayan | |
| 2004/0187386 A1 | 9/2004 | Wangerow | |
| 2004/0197238 A1 | 10/2004 | Mirkovic et al. | |
| 2005/0178063 A1 | 8/2005 | Reinke | |
| 2006/0013759 A1 | 1/2006 | Jiang et al. | |
| 2006/0154123 A1* | 7/2006 | Kim et al. | 429/20 |
| 2006/0225349 A1 | 10/2006 | Krause et al. | |
| 2006/0248800 A1 | 11/2006 | Miglin et al. | |
| 2007/0221541 A1 | 9/2007 | McClanahan et al. | |
| 2007/0224094 A1* | 9/2007 | Park et al. | 422/188 |

FOREIGN PATENT DOCUMENTS

| | | |
|---|---|---|
| WO | 2001000314 | 1/2001 |
| WO | 2002034383 | 5/2002 |
| WO | WO 2005/107935 A1 | 11/2005 |
| WO | WO 2006/097904 A2 | 9/2006 |
| WO | WO 2006/097905 A1 | 9/2006 |
| WO | 2007075429 | 7/2007 |

OTHER PUBLICATIONS

Garcia et al., "Hydrogen production by the steam reforming of ethanol: thermodynamic analysis", 16(5) Int. J. Hydrogen Energy (1991), pp. 307-312.

Haga et al., "Catalytic properties of supported cobalt catalysts for steam reforming of ethanol", 48 Catalysis Lett. (1997), pp. 223-227.

Fishtik et al., "A thermodynamic analysis of hydrogen production by steam reforming of ethanol via response reactions", 25 Int. J. Hydrogen Energy (2000), pp. 31-45.

International Search Report of corresponding counterpart international application No. PCT/US2008/087634 dated May 13, 2009.

* cited by examiner

COUNTER-CURRENT OXIDATION AND STEAM METHANE REFORMING PROCESS AND REACTOR THEREFOR

FIELD

Provided herein is a process for preparation of a synthesis gas by counter-current flow of an oxidation reactant stream through an oxidation chamber and a reforming reactant stream through a steam reforming chamber. Also provided is a reactor for conducting the reaction.

BACKGROUND

The steam methane reforming (SMR) reaction is widely used for synthetic gas and hydrogen production. The SMR reaction is strongly endothermic and requires very high temperatures to obtain high methane conversions. The high heat required for the SMR process can often be obtained from oxidation/combustion reactions. The heat exchange between the reactions can be facilitated by various devices, including heat exchange plate fins. Usually, this heat exchange is the limiting factor for the steam methane reforming reaction rates and methane conversions. The SMR and oxidation reactions are usually carried out in the presence of a catalyst in counter-current flow. In these reactions, the SMR exit stream is usually coupled with the oxidation inlet stream such that the SMR exit stream has high temperature and high methane conversion. In conventional reactor design the oxidation catalyzed heat exchange fins in the oxidation chamber are present in the same length of the oxidation chamber as the reforming catalyzed heat exchange fins in the reforming chamber. Therefore, when the oxidation reactants have pre-combustion before the catalyzed reactor entrance, the reforming reactor has the highest temperature. Typically, the oxidation reactor transfers a substantial part of the heat to the reforming side thereby dropping the temperature of the oxidation chamber. This low oxidation temperature reduces the rate of oxidation in the majority of the oxidation chamber. This results in reduced oxidation side fuel conversion and thus reduced system efficiency.

There have been extensive efforts, over a long period of time, aimed at improving the speed and efficiency of the SMR reaction. Despite these attempts, there remains a need for a method and apparatus to carry out the SMR reaction more efficiently and cost effectively.

SUMMARY OF THE INVENTION

Provided herein is a process for reforming hydrocarbons, such as methane and reactor for conducting the reaction. In one embodiment, provided herein is a process for preparing a synthesis gas by hydrocarbon reforming reaction, such as steam methane reforming reaction. The reaction is conducted in a reactor by counter-currently providing an oxidation reactant stream through an oxidation chamber and a reforming reactant stream through a steam reforming chamber, wherein the oxidation chamber is adjacent to the reforming chamber, the oxidation chamber and the reforming chamber are separated by a thermally conductive surface, and the oxidation chamber extends beyond the reforming chamber. The oxidation chamber comprises an inlet for the oxidation reactant stream and outlet for the oxidation product stream. The reforming chamber comprises an inlet for the reforming reactant stream and an outlet for the reformed stream, such that the outlet of the oxidation chamber is adjacent to the inlet of the reforming chamber and the inlet of the oxidation chamber extends beyond the outlet of the reforming chamber thereby constituting an extended oxidation chamber. In one embodiment, the extended oxidation chamber comprises a catalyst deposited on the heat exchanger fins in the extended segment of the oxidation chamber but there is no reforming chamber corresponding to this segment and therefore, no heat exchange fins to transfer heat from this segment. Thus, most of the heat generated by the oxidation reaction in the extended oxidation chamber stays within the oxidation chamber.

The oxidation reactant stream flows into the oxidation chamber through an inlet that is situated at a front end of the extended oxidation chamber. The oxidation reaction proceeds in the presence of an oxidation catalyst. The oxidation reaction in this extended oxidation chamber is nearly adiabatic. The oxidation stream continues to flow through the oxidation chamber adjacent to the reforming chamber. At which point, heat generated in the oxidation chamber starts transferring to the reforming chamber through the thermal conducting surface and heat exchange fins. The heat exchange fins enhance the heat transfer and hence, increase the SMR reaction rates and $CH_4$ conversions. These heat exchange fins can provide high density surface areas for both high activity catalyst deposition for process intensification and enhanced heat transfer.

The temperature inside the reforming chamber increases and steam reforming reaction is initiated. The reforming reaction proceeds in presence of a reforming catalyst deposited on heat exchange fins in the reforming chamber.

In one aspect, the steam methane reforming reaction is carried out in a reactor, wherein the oxidation and reforming chambers are of the same length and wherein the oxidation chamber comprises a catalyst zone and a no catalyst zone. In such reactors, a substantial part of the oxidation reaction is completed in the catalyst zone of the oxidation chamber and the heat generated is transferred to the reforming chamber.

In another embodiment, provided is a reactor for generating the synthesis gas by the process described herein. The reactor comprises an oxidation chamber and a reforming chamber, wherein the oxidation chamber and the reforming chamber are separated by a thermally conductive surface. The reforming chamber comprises an inlet for a reforming reactant stream, an outlet for the reformed stream, and a reforming catalyst disposed on a plurality of heat exchange fins. The oxidation chamber comprises an inlet for an oxidation reactant stream, an outlet for the oxidation product stream, and an oxidation catalyst disposed on a plurality of heat exchange fins, such that the inlet of the oxidation chamber is adjacent to the inlet of the reforming chamber. In one embodiment, the heat exchange fins are brazed on the thermally conductive surface.

In certain embodiments, the reactor for generating the synthesis gas is further connected to a pressure swing adsorption unit to produce pure hydrogen. In one embodiment, the reactor for generating the synthesis gas is further connected a membrane separator to produce pure hydrogen or to adjust the ratio of $H_2$ to CO to a desirable ratio. In one aspect, the reactor for generating the synthesis gas is further connected a Fischer-Tropsch reactor to produce liquid hydrocarbons. In another aspect, the reactor for generating the synthesis gas is further connected an alcohol synthesis reactor to produce alcohols. In yet another aspect, the reactor for generating the synthesis gas is further connected to a membrane separator and a Fischer-Tropsch reactor. In a further aspect, the reactor for generating the synthesis gas is further connected a membrane separator and an alcohol synthesis reactor.

According to one aspect of the process provided herein, only the extended oxidation chamber has the oxidation catalyst and there is no catalyst beyond the extended oxidation chamber. In addition, the extended oxidation chamber does not contain an adjacent steam methane reforming chamber and the heat exchange fins. The oxidation reaction takes place under nearly adiabatic conditions in this section. A substantial part of the heat generated stays in the oxidation chamber and is utilized in increasing the rate of oxidation reaction in the oxidation chamber. A significant portion of the fuel is oxidized and a large proportion of heat generated is transferred to the reforming chamber beyond the extended oxidation chamber. This reactor design achieves high fuel conversion and high reforming rate at a reduced catalyst loading. This results in reduced capital costs for the reactor.

In another aspect, the reduced costs are achieved by introducing a no catalyst zone in the oxidation chamber. In this embodiment, oxidation reactant stream enters the oxidation chamber inlet at a pre-combustion temperature. A substantial part of the oxidation reaction is completed in the catalyst zone of the oxidation chamber. A significant amount of the heat generated is transferred to the reforming chamber, which results in drop in the temperature in the oxidation chamber. At this reduced temperature, the oxidation reaction is very slow and does not have much practical application. The oxidation chamber therefore can be designed such that there is no catalyst at this section of the oxidation chamber. Such reactor design results in reduced reactor costs while achieving high efficiency in the oxidation and reforming reactions.

BRIEF DESCRIPTION OF THE DRAWING FIGURES

DEFINITIONS

To facilitate the understanding of the subject matter disclosed herein, a number of terms, abbreviations or other shorthand as used herein are defined below. Any term, abbreviation or shorthand not defined is understood to have the ordinary meaning used by a skilled artisan contemporaneous with the submission of this application.

As used herein, "oxidation reactant stream" refers to a gas stream comprising hydrogen, methane, carbon monoxide and oxygen.

As used herein, "oxidation stream" refers to a gas stream in the oxidation chamber and comprises hydrogen, methane, carbon monoxide and oxygen.

As used herein, "oxidation product stream" refers to a gas stream exiting from the oxidation chamber and comprises hydrogen, methane and carbon oxides including carbon monoxide and carbon dioxide As used herein, "oxygen" or "oxygen source" refers to a gas comprising molecular oxygen, air or other oxidants, such as nitrogen oxides, which can function as a source of oxygen. The oxygen source may be carbon dioxide, carbon monoxide or a peroxide (e.g., hydrogen peroxide). Gaseous mixtures containing oxygen, such as mixtures of oxygen and air, or mixtures of oxygen and an inert gas (e.g., helium, argon, etc.) or a diluent gas (e.g., carbon dioxide, water vapor, etc.) may also be used as oxygen source in the oxidation stream.

As used herein, "reforming reactant stream" refers to a gas stream comprising water and natural gas.

As used herein, "reformed stream" refers to a gas stream exiting from the reforming chamber and comprises synthesis gas.

As used herein, "water" generally includes, liquid water, combinations of liquid water and steam, and steam.

As used herein, "reforming chamber" refers to the reaction chamber where the steam methane reforming reaction takes place.

As used herein, "oxidation chamber" refers to a reaction chamber in the reactor where the oxidation and combustion reactions take place. The oxidation and reforming chamber are adjacent to each other and are separated by a thermally conductive surface.

As used herein, "extended oxidation chamber" or "extended oxidation segment" or "extended segment" refers to the section of the oxidation chamber that extends beyond the reforming chamber.

As used herein, "no catalyst zone" refers to the section of the oxidation chamber where there is no catalyst coating. In certain embodiments, the oxidation chamber comprises no-catalyst zone beyond the extended oxidation chamber such that heat exchange fins in the oxidation chamber beyond the extended segment do not contain catalyst coating.

As used herein, "counter-currently" or "counter-current" refers to a flow of gas streams in the opposite direction.

As used herein, "thermally conductive surface" refers to a surface, typically comprising a metal or metal alloy, between the oxidation and reaction chambers.

Figure 6A:
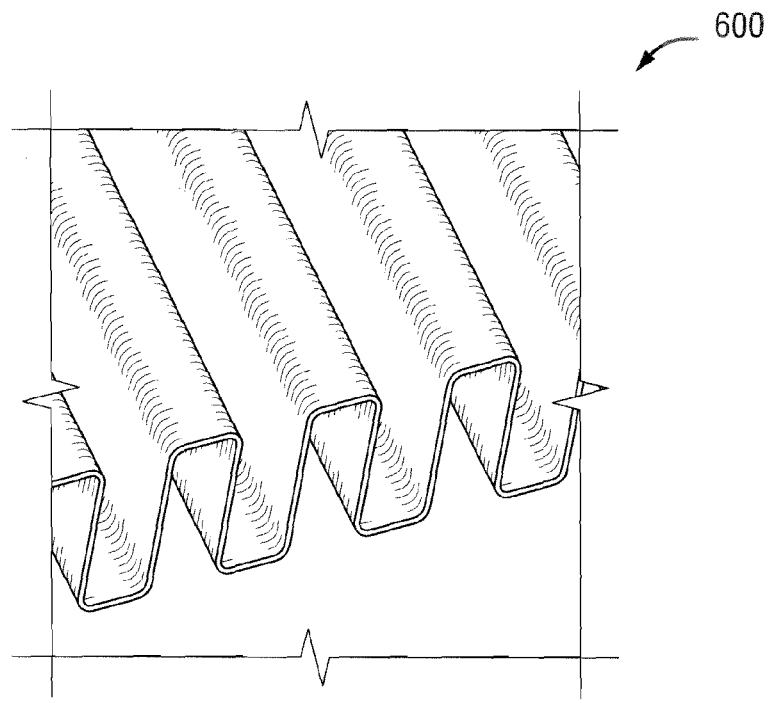
FIGS. 6a, 6b and 6c depict exemplary fins for use in the processes and reactor provided herein.
Figure 6B:
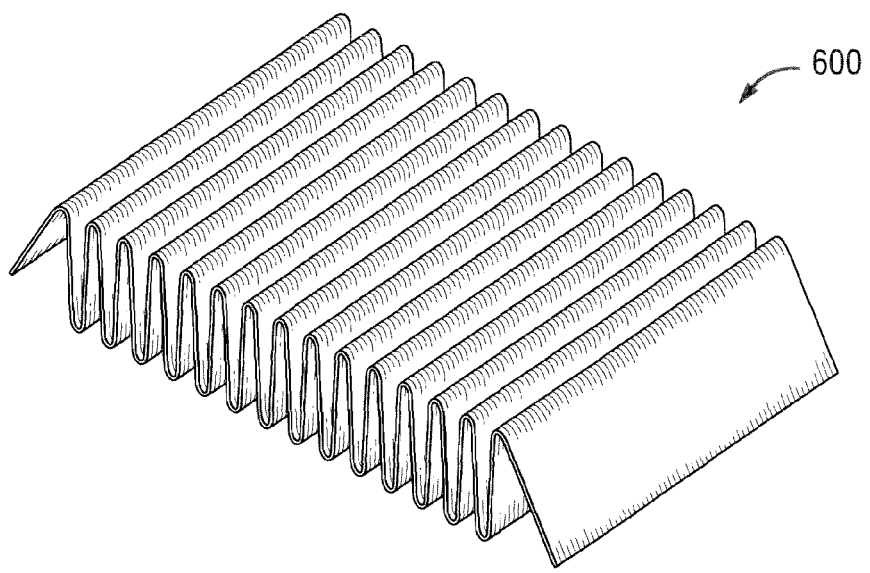
Figure 6C:
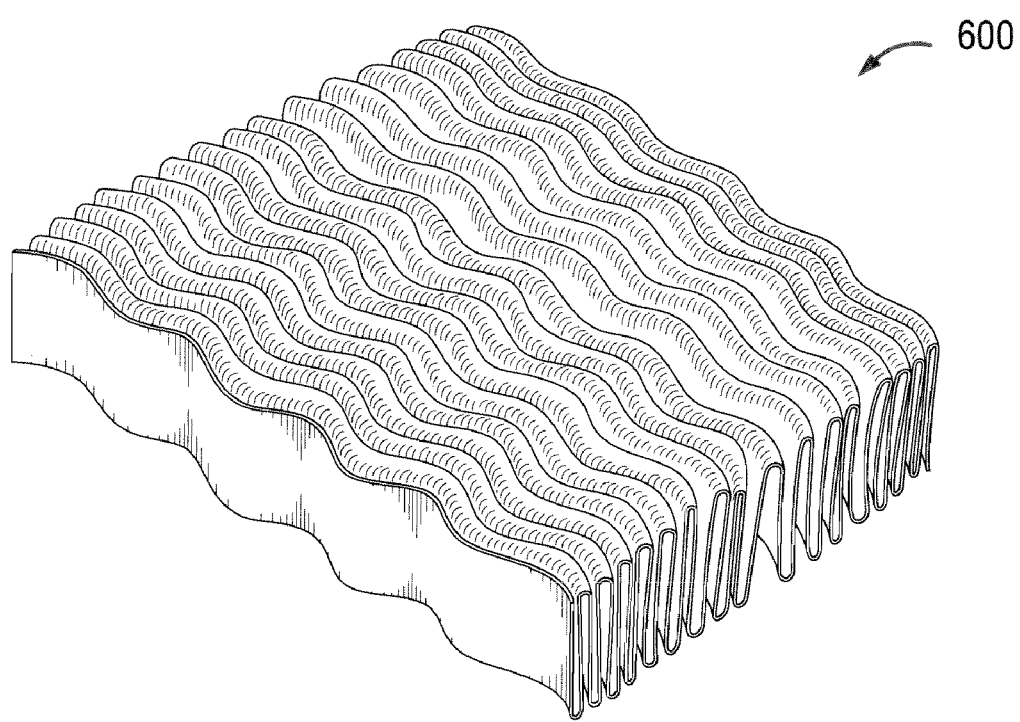

As used herein, "heat exchange fin" refers to a piece of thermally conductive material, typically of metal or metal alloy, that extends in the oxidation or reforming chamber from the thermally conductive surface in the direction normal to the flow of the oxidation and reforming streams. The fin is typically mounted so that its plane is normal to the axis of the oxidation and reforming chambers. However, the fin may instead be mounted to have its plane at an angle with respect to the axis. In certain embodiments, the fin types that can be used include straight fin, perforated fin, offset fin, louvered fin, wave fin and corrugated fin. Exemplary fins 600 are depicted in FIGS. 6a, 6b and 6c.

As used herein, "synthesis gas" or "syngas" refers a mixture that includes hydrogen and carbon monoxide. In addition synthesis gas may comprise water, carbon dioxide, unconverted light hydrocarbon feedstock and various impurities.

As used herein, "at least a part of heat" refers to at least about 10% of the heat generated, at least about 20% of the heat generated, at least about 30% of the heat generated, at least about 40% of the heat generated or at least about 50% of the heat generated.

As used herein, "substantial part of heat" refers to more than 50% of the heat generated, more than about 60% of the heat generated, more than about 70% of the heat generated, more than about 80% of the heat generated, more than about 90% of the heat generated or more than about 95% of the heat generated.

DESCRIPTION OF EMBODIMENTS

In one embodiment, provided herein is a process for preparing a synthesis gas in a reactor by counter-currently providing an oxidation reactant stream through an oxidation chamber and a reforming reactant stream through a steam reforming chamber, wherein the oxidation chamber is adjacent to the reforming chamber, the oxidation chamber and the reforming chamber are separated by a thermally conductive surface, and the oxidation chamber extends beyond the reforming chamber.

In the reactor, the oxidation chamber comprises an inlet for the oxidation reactant stream and an outlet for the oxidation product stream. The reforming chamber comprises an inlet for the reforming reactant stream and an outlet for the reformed stream, such that the outlet of the oxidation chamber is adjacent to the inlet of the reforming chamber and the inlet of the oxidation chamber extends beyond the outlet of the reforming chamber thereby constituting an extended oxidation chamber. The extended oxidation chamber comprises a catalyzed fin segment in the oxidation chamber. However, the reforming chamber and therefore, the heat exchange fins, are lacking adjacent to the extended oxidation chamber. Thus, most of the heat generated by the oxidation reaction in the extended oxidation chamber stays within the oxidation chamber.

In one embodiment, the extended oxidation chamber contains an oxidation catalyst in the extended segment in the oxidation chamber but there are no heat exchange fins on the reforming side in this segment. In one embodiment, the extended oxidation chamber contains an oxidation catalyst in the extended segment in the oxidation chamber and no catalyst beyond the extended segment, thereby constituting a catalyst zone and a no-catalyst zone in the oxidation chamber. The no-catalyst zone has a corresponding reforming chamber with heat exchange fins to transfer heat from oxidation chamber to the reforming chamber.

The oxidation reactant stream used in the process comprises hydrogen, methane, carbon monoxide and oxygen. The oxygen or oxygen source may comprise molecular oxygen, air or other oxidants, such as nitrogen oxides, which can function as a source of oxygen. The oxygen source may be carbon dioxide, carbon monoxide or a peroxide (e.g., hydrogen peroxide). Gaseous mixtures containing oxygen, such as mixtures of oxygen and air, or mixtures of oxygen and an inert gas (e.g., helium, argon, etc.) or a diluent gas (e.g., carbon dioxide, water vapor, etc.) may also be used.

The reforming reactant stream used in the process comprises water and natural gas. As used herein, the term "water" generally includes, liquid water, combinations of liquid water and steam, and steam.

Steam methane reforming ("SMR") comprises an endothermic reaction requiring 205.9 KJ/mol of heat and proceeds according to the following equation:

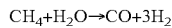

$$CH_4 + H_2O \rightarrow CO + 3H_2$$

The reforming reaction is conducted in presence of steam methane reforming (SMR) catalyst. Any SMR catalyst known to one of skilled in the art could be used. Exemplary SMR catalysts include, but are not limited to rhodium, iridium, nickel, palladium, platinum and combinations thereof.

The oxidation reaction is typically conducted in the presence of an oxidation catalyst. Any oxidation catalyst known to one of skilled in the art could be used. Exemplary oxidation catalysts include, but are not limited to rhodium, iridium, nickel, palladium, platinum, carbide of group Vlb and combinations thereof.

Figure 1:
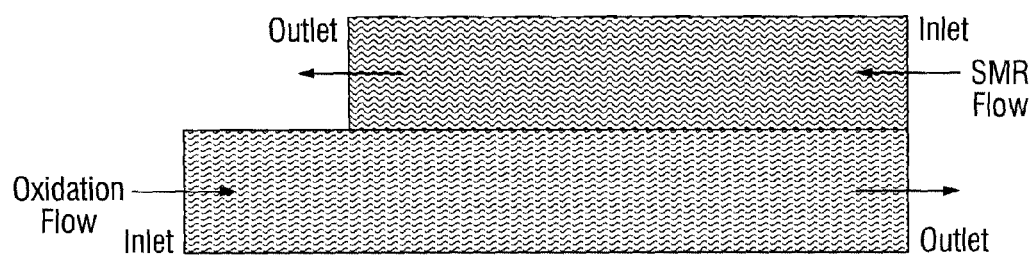
FIG. 1 is a schematic illustration of counter-current oxidation and steam methane reforming flow in a reactor with an extended oxidation chamber described herein.

FIG. 1 provides a schematic illustration of counter-current oxidation and steam methane reforming flow in a reactor with an extended oxidation chamber described herein. The process comprises providing an oxidation reactant stream in the oxidation chamber through an inlet. The oxidation reactant stream is flown in the extended section of the oxidation chamber through an inlet. In one embodiment, the oxidation stream enters the extended section of oxidation chamber at a temperature of from about 25 to about 300° C. In certain embodiments, the oxidation reactant stream enters the extended section of the oxidation chamber through an inlet at a temperature of at least about 25, at least about 50, at least about 75, at least about 100, at least about 125, at least about 150, at least about 175, at least about 200, at least about 225, at least about 250, at least about 250, at least about 275, at least about 300, at least about 325 or about 350° C. In certain embodiments, the oxidation reactant stream enters the extended section of the oxidation chamber through an inlet at a temperature of about 100-250° C., about 130-230° C., about 150-220° C. about 170-210° C. or about 180-210° C.

The oxidation reaction proceeds in the oxidation chamber in the presence of an oxidation catalyst. The oxidation stream reactants: hydrogen and methane gas, oxidize in presence of the oxidation catalyst. The oxidation reaction in the extended section of the oxidation chamber is nearly adiabatic because there are no heat exchange fins in the reforming chamber to transfer the heat out. The fuel is fully converted in the extended section of the oxidation chamber under adiabatic conditions. In certain embodiments, the temperature in the extended section of the oxidation chamber is between about 400 to about 900° C. In certain embodiments, the temperature in the extended section of the oxidation chamber is at least about 400, at least about 500, at least about 600, at least about 650, at least about 700, at least about 750, at least about 800, at least about 850 or at least about 900° C.

In certain embodiments, the temperature in the extended section of the oxidation chamber is about 700-900° C. about 750-900° C., about 800-900° C., about 850-900° C. or about 870-900° C.

In certain embodiments, the oxidation reaction is controlled by adjusting the oxygen flow such that the temperature inside the oxidation chamber stays lower than the catalyst calcination temperature. In certain embodiments, the flow rate of air in the oxidation chamber is maintained at about 1500-3000 or about 1700-2500 slpm. In certain embodiments, the flow rate of air in the oxidation chamber is maintained at about 1800-2500 slpm.

The pressure in the oxidation chamber is maintained at a range suitable to overcome the total pressure drop to provide the required air flow. In certain embodiments, the pressure in the oxidation chamber is maintained at about 1-5 psig, about 1-3 psig or about 1-2 psig.

The oxidation stream continues to flow through the oxidation chamber adjacent to the reforming chamber. At which point, a substantial part of the heat generated in the oxidation chamber starts transferring to the reforming chamber through the heat exchange fins.

The reforming reactant stream enters the reforming chamber through an inlet. In certain embodiments, the reforming reactant stream enters the reforming chamber at a temperature of about 400° C.-700° C. In certain embodiments, the reforming reactant stream enters the reforming chamber inlet at a temperature of at least about 400, at least about 450, at least about 500, at least about 550, at least about 600, at least about 650 or at least about 700° C. In certain embodiments, the reforming reactant stream enters the reforming chamber inlet at a temperature in a range of about 400-600° C. about 470-600° C. about 500-600° C. about 530-570° C. or about 540-560° C.

Figure 2:
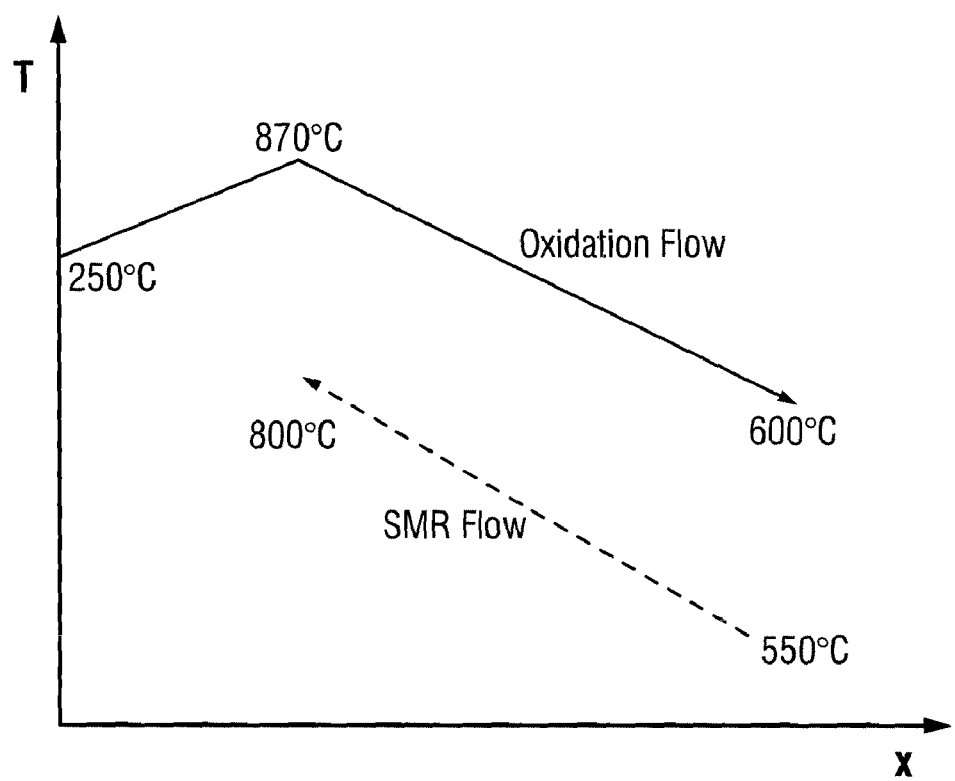
FIG. 2 is an exemplary temperature profile for an embodiment of the process undertaken in a reactor with an extended oxidation chamber.

The temperature inside the reforming chamber increases as a substantial part of the heat generated in the oxidation chamber is transferred to the reforming chamber. In certain embodiments, the temperature of the reforming chamber is about 600° C.-850° C. In certain embodiments, temperature in the reforming chamber is at least about 600, at least about 650, at least about 700, at least about 750, at least about 770, at least about 800, at least about 830 or at least about 850° C. In certain embodiments, the reforming chamber temperature is in the range of about 700-850° C., about 770-850° C., about 790-830° C. or about 790-810° C. FIG. 2 provides an exemplary temperature profile for process undertaken in a reactor with an extended oxidation chamber.

In certain embodiments, the pressure in the reforming chamber is maintained such that reformed stream has pressure required for the downstream PSA, membrane separator, Fisher-Trophsch reactor or alcohol synthesis reactor while maintaining the $CH_4$ conversion in the SMR at acceptable conversion. In certain embodiments, the pressure is maintained at about 1 atm to 20 atm or about 5 atm to 15 atm. In certain embodiments, the pressure is maintained at about 7-12 atm or about 10 atm.

In certain embodiments, the flow rate of the reforming reactant stream is maintained at about 0.05-0.3 MMScfd, about 0.08-0.2 MMScfd or about 0.08-0.15 MMScfd for small scale hydrogen application such as hydrogen fuelling station. In certain embodiments, the flow rate of the reforming reactant stream is maintained at about 0.1 MMScfd for small scale hydrogen application such as hydrogen fuelling station. In certain embodiments, the flow rate of the reforming reactant stream is maintained at about 5-20 MMScfd, about 7-15 MMScfd or about 8-12 MMScfd for small scale industrial GTL. (Gas-to-Liquid) application. In certain embodiments, the flow rate of the reforming reactant stream is maintained at about 10 MMScfd for small scale industrial GTL (Gas-to-Liquid) application.

In one embodiment, provided herein is a fuel reforming process for generating a synthesis gas comprising: flowing an oxidation reactant stream through an oxidation chamber and a reforming reactant stream through a reforming chamber, such that the oxidation reactant stream and the reforming reactant stream are counter-current to each other.

wherein the oxidation chamber and the reforming chamber are separated by a thermally conductive surface;

wherein the reforming chamber comprises: an inlet for a reforming reactant stream, an outlet for the reformed stream, and a reforming catalyst disposed on a plurality of heat exchange fins;

wherein the oxidation chamber comprises: an inlet for an oxidation reactant stream, an outlet for the oxidation product stream, and an oxidation catalyst disposed on a plurality of heat exchange fins, wherein the outlet of the oxidation chamber is adjacent to the inlet of the reforming chamber and the inlet of the oxidation chamber extends beyond the outlet of the reforming chamber, thereby constituting an extended oxidation chamber; and wherein the heat exchange fins are brazed on the thermally conductive surface.

In one embodiment, provided herein is a fuel reforming process for generating a synthesis gas comprising: flowing an oxidation reactant stream through an oxidation chamber and a reforming reactant stream through a reforming chamber, such that the oxidation reactant stream and the reforming reactant stream are counter-current to each other.

wherein the oxidation chamber and the reforming chamber are separated by a thermally conductive surface;

wherein the reforming chamber comprises: an inlet for a reforming reactant stream, an outlet for the reformed stream, and a reforming catalyst disposed on a plurality of heat exchange fins;

wherein the oxidation chamber comprises: an inlet for an oxidation reactant stream, an outlet for the oxidation product stream, an oxidation catalyst and a plurality of heat exchange fins, wherein the outlet of the oxidation chamber is adjacent to the inlet of the reforming chamber and the inlet of the oxidation chamber extends beyond the outlet of the reforming chamber, thereby constituting an extended oxidation chamber; and wherein the heat exchange fins are brazed on the thermally conductive surface; and wherein the oxidation catalyst is present only in the extended oxidation chamber.

Figure 3:
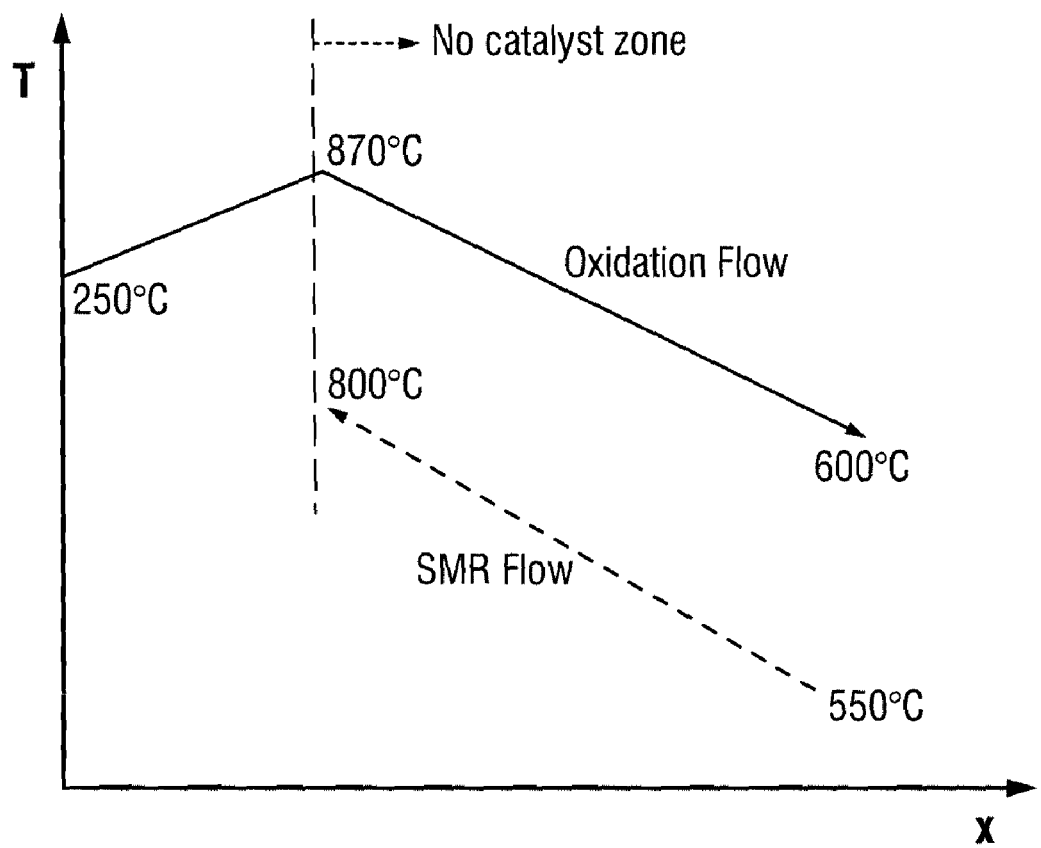
FIG. 3 is an exemplary temperature profile for an embodiment of the process undertaken in a reactor with an extended oxidation chamber and a no-catalyst zone beyond the extended oxidation chamber.

Thus, in one aspect, provided herein is process for fuel conversion wherein there is no oxidaion catalyst beyond the extended oxidation chamber, thereby comprising a catalyst zone and a no catalyst zone in the oxidation chamber. In such embodiments, the oxidation reactant stream enters the oxidation chamber inlet at a precombustion temperature. FIG. 3 provides a schematic illustration of counter-current oxidation and steam methane reforming flow in a reactor with no catalyst zone beyond the extended oxidation chamber as described herein.

Figure 4:
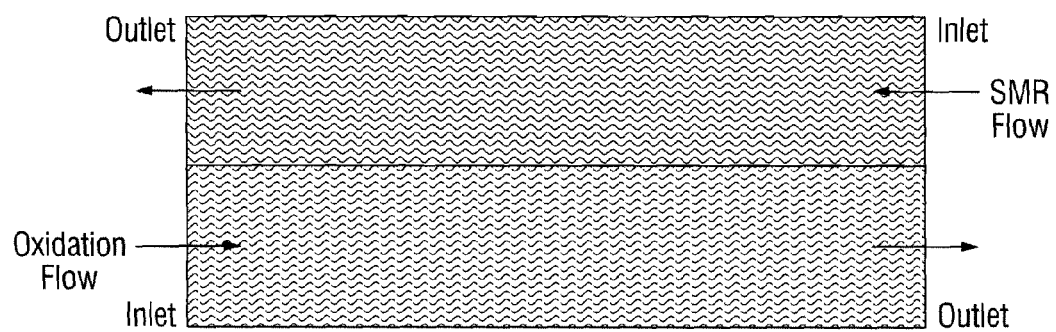
FIG. 4 is a schematic illustration of counter-current oxidation and steam methane reforming flow in a reactor comprising oxidation and reforming chambers of same length.

In another embodiment, provided herein is process for fuel conversion wherein the oxidation and reforming chamber are of the same length and the oxidation chamber comprises a catalyst zone and a no catalyst zone. In such embodiments, the oxidation reactant stream enters the oxidation chamber inlet at a precombustion temperature. FIG. 4 provides a schematic illustration of counter-current oxidation and steam methane reforming flow in a reactor with no catalyst zone as described herein.

In certain embodiments, the oxidation reactant stream temperature at the inlet is about 600 to about 850° C. In certain embodiments, the oxidation reactant stream temperature at the inlet is at least about 600, at least about 650, at feast about 700, at least about 750, at least about 800 or at least about 850° C. In certain embodiments, the oxidation reactant stream temperature at the inlet is about 700-850° C. about 750-830° C. about 770-820° C., about 780-810° C. or about 790-810° C.

The oxidation reaction proceeds in the oxidation chamber in the presence of an oxidation catalyst. The oxidation stream reactants: hydrogen, carbon monoxide and methane gas, oxidize in presence of an oxidation catalyst, thus increasing the temperature inside the oxidation chamber. In certain, embodiments, the temperature in the oxidation chamber reaches between about 700 to about 950° C. In certain embodiments, the temperature inside the oxidation chamber is at least about 700, at least about 750, at least about 800, at least about 850, at least about 870 or at least about 900° C. In certain embodiments, the temperature in the oxidation chamber is about 700-900° C., about 750-900° C., about 800-900° C., about 850-880° C. or about 860-890° C.

As the oxidation stream continues to flow through the oxidation chamber adjacent to the reforming chamber, a substantial part of the heat generated in the oxidation chamber is transferred to the reforming chamber through the heat exchange fins. As a result, the temperature inside the oxidation chamber starts decreasing. In certain embodiments, the temperature of the oxidation chamber reaches to about 700 to 800° C. about 730- to 780° C. or about 740 to 760° C. At this temperature, the rate of oxidation reaction lowers significantly.

Figure 5:
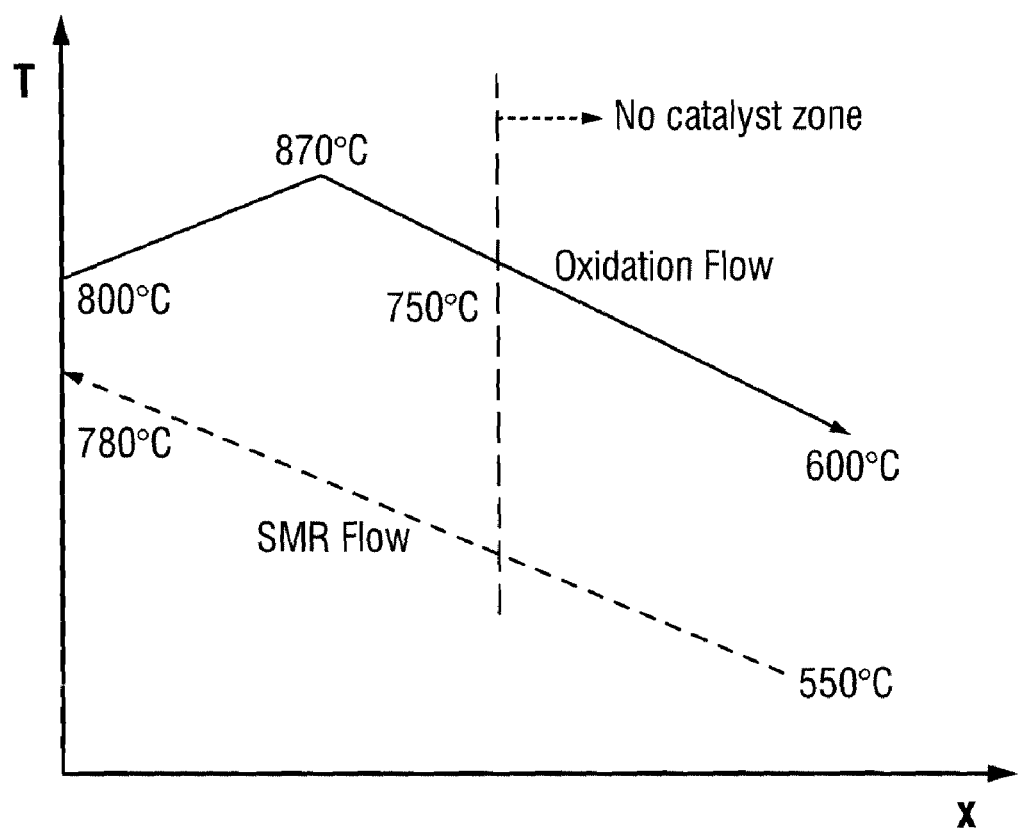
FIG. 5 is an exemplary temperature profile for an embodiment of the process undertaken in a reactor with no catalyst zone in the oxidation chamber.

The oxidation chamber beyond the temperature point of from about 800 to 700° C. does not contain catalyst coating. Thus, the reactor design comprising a catalyst zone and a no catalyst zone reduces the catalyst load and reactor cost associated with the catalyst coating. FIG. 5 provides an exemplary temperature profile for an embodiment of the process undertaken in a reactor wherein the oxidation chamber and the reforming chamber have the same length and the oxidation chamber comprises a catalyst zone and a no catalyst zone.

The flow rates of the various feed streams, air, methane-containing gas and oxidation feed gas, are controlled by means such as changing blower, pump, and compressor flows, automated or manual control valves, a system controller that automates control over the flows of oxygen to the oxidation chamber, and fuel and water to the reforming chamber, and other similar controllers. Other control means will be apparent to one skilled in the ail and are included within the scope of the processes and apparatus described herein.

In one embodiment, the process further comprises the step of feeding the synthesis gas generated to a pressure swing unit to produce pure hydrogen.

In some embodiments, purification is carried out in a pressure swing adsorption ("PSA") unit having adsorptive materials that selectively adsorb impurities and allow a hydrogen-enriched reformate to pass. In the PSA unit, by-products (CO and $CO_2$) and unconverted $CH_4$ in the process gas are selectively adsorbed and hydrogen is allowed to pass. When the PSA unit is fully saturated with by-products, it can be regenerated using a pressure using technique and a small amount of hydrogen. A mixture of CO, $CO_2$, $CH_4$, and hydrogen exiting the PSA unit during regeneration cycles is typically referred to as off-gas. The fuels in the off-gas can be combusted to produce heat that can be used to preheat reactant streams and as the feed for oxidation chamber for the steam reforming reaction described above.

Suitable PSA units include those known in the art for separating hydrogen from a process stream, such as are described in U.S. Pat. No. 4,238,204 issued Dec. 9, 1980 to Perry; U.S. Pat. No. 4,690,695 issued Sep. 1, 1987 to Doshi; U.S. Pat. No. 5,256,174 issued Oct. 26, 1993 to Kai et al.; U.S. Pat. No. 5,435,836 issued Jul. 25, 1995 to Anand et al.; U.S. Pat. No. 5,669,960 issued Sep. 23, 1997 to Couche; U.S. Pat. No. 5,753,010 issued May 19, 1998 to Sircar et al.; and U.S. Pat. No. 6,471,744 issued Oct. 29, 2002 to Hill, the descriptions of which are incorporated herein by reference. In some embodiments, the purification unit will comprise a compact PSA. Suitable compact PSAs can include a rotary-type PSA such as are described in U.S. Pat. No. 6,063,161 issued May 16, 2000 to Keefer et al. and in U.S. Pat. No. 6,406,523 issued Jun. 18, 2002 to Connor et al., the descriptions of which are incorporated herein by reference. Compact PSAs having rotary elements are commercially available from Questair Technologies, Inc. of Burnaby. Canada.

In one embodiment, the process for generating synthesis gas further comprises the step of feeding the synthesis gas to a membrane separator to produce pure hydrogen. In the membrane separator, the synthesis gas is passed through a hydrogen-separating membrane to selectively recover hydrogen from the synthesis gas. The hydrogen-separating membranes comprise hydrogen-permeable metals, such as palladium and alloys of palladium. Suitable membrane separators those known in the art, such as are described in U.S. Pat. Nos. 5,741,474; 6,767,389; 7,005,113; 7,195,663 and U.S. Application No. 20060248800, the disclosures of which are all incorporated herein by reference.

In certain embodiments, the synthesis gas is fed to a membrane separator to produce synthesis gas with a desired $H_2$ to CO ratio. In such embodiments, the synthesis gas passes through a hydrogen-separating membrane to separate a predetermined quantity of hydrogen from the synthesis gas to obtain the desired ratio of $H_2$ to CO in the synthesis gas. In certain embodiment, the desired ratio of hydrogen to carbon monoxide is about 2:1, 2.08:1, 2.2:1 or 2.5:1. In certain embodiments, the ratio of $H_2$ to CO in the synthesis gas is suitable for feed in the Fischer-Tropsch reactor.

In one embodiment, the process for generating synthesis gas further comprises feeding the synthesis gas to a Fischer-Tropsch reactor to produce a liquid hydrocarbon. Any Fischer-Tropsch reactor known in the art can be used, such as those described in U.S. Pat. Nos. 5,252,613 and 7,108,835, the disclosures of which are all incorporated herein by reference.

In one embodiment, the process for generating synthesis gas further comprises feeding the synthesis gas to an alcohol synthesis reactor to produce alcohols including methanol, ethanol and higher alcohols. Any alcohol synthesis reactor known in the art can be used, such as those described in U.S. Pat. Nos. 4,973,453; 6,130,259; 6,939,999, the disclosures of which are all incorporated herein by reference.

Also provided is a reactor for generating a synthesis gas comprising an oxidation chamber and a reforming chamber, wherein the oxidation chamber and the reforming chamber are separated by a thermally conductive surface, wherein the reforming chamber comprises: an inlet for a reforming stream, an outlet for the reforming stream, and a reforming catalyst disposed on a plurality of heat exchange fins; the oxidation chamber comprises: an inlet for an oxidation stream, an outlet for the oxidation stream, and an oxidation catalyst disposed on a plurality of heat exchange fins, wherein the outlet of the oxidation chamber is adjacent to the inlet of the reforming chamber and the inlet of the oxidation chamber extends beyond the outlet of the reforming chamber thereby constituting an extended oxidation chamber; and the heat exchange fins are brazed on the thermally conductive surface.

In another embodiment, provided herein is a reactor for generating the synthesis gas by a fuel reforming reaction, the reactor comprising: an oxidation chamber and a reforming chamber separated by a thermally conductive surface, wherein the reforming chamber comprises; an inlet for a reforming stream, an outlet for the reforming stream, and a reforming catalyst disposed on a plurality of heat exchange fins;

the oxidation chamber comprises: an inlet for an oxidation stream, an outlet for the oxidation stream and an oxidation catalyst disposed on a plurality of heat exchange fins;

the oxidation chamber comprises a catalyst zone and a no catalysts zone;

and the heat exchange fins are brazed on the thermally conductive surface.

The thermally conductive surface typically comprises a metal, including a metallic alloy. Any metal or alloy that is chemically compatible with the oxidation and reforming reactions is potentially suitable. Potentially suitable metals include, but are not limited to, aluminum, brass, copper, stainless steel, mild steel, titanium, nickel, Inconel® and chromalloy.

The reforming chamber comprises an inlet for a reforming reactant stream, an outlet for the reformed stream, and a reforming catalyst disposed on a plurality of heat exchange fins. The oxidation chamber comprises an inlet for an oxidation reactant stream, an outlet for the oxidation product stream, and an oxidation catalyst disposed on a plurality of heat exchange fins. The oxidation and reforming chambers are arranged such that the inlet of the oxidation chamber is adjacent to the outlet of the reforming chamber.

The heat exchange fins used herein can have any geometry suitable for use in the oxidation and reforming chambers. In certain embodiments the heat exchange fins are planar fins (or plate fins), individually attached fins (e.g., a series of circular fins attached at intervals along the length of the thermally conductive surface), or any other type of heat exchange fins known to one skilled in the art.

The heat exchange fins typically comprise a metal, including a metallic alloy. Any metal or alloy that is suitable for use in the oxidation and reforming reactions is potentially suitable. Exemplary metals include, but are not limited to, aluminum, brass, copper, stainless steel, mild steel, titanium, nickel, Inconel® and chromalloy. In certain embodiments, the material of the thermally conductive surface the heat exchange fins is the same. In other embodiments, the material of the thermally conductive surface and the heat exchange fins is different.

In certain embodiments, the catalysts fins are brazed on the thermally conductive surface. Other methods known to one of skill in the art can be used for attaching the fins to the thermally conductive surface. Examples of such include soldering, welding, extrusion, mechanical fit and tension wound.

In certain embodiments, the oxidation catalyst is further deposited on the heat exchange fins. In certain embodiments, the reforming catalyst is further deposited on the heat exchange fins.

In one embodiment, the reactor further comprises a pressure swing unit pressure swing unit to produce pure hydrogen downstream from reforming chamber.

In one embodiment, the reactor further comprises a membrane separator downstream from reforming chamber to produce pure hydrogen or to produce synthesis gas with a desired $H_2$ to CO ratio.

In one embodiment, the reactor further comprises a Fischer-Tropsch reactor downstream from reforming chamber to produce a liquid hydrocarbon.

In one embodiment, the reactor further comprises an alcohol synthesis reactor downstream from reforming chamber to produce alcohols.

In one embodiment, the reactor further comprises membrane separator and a Fischer-Tropsch reactor downstream from reforming chamber.

In one embodiment, the reactor further comprises a membrane separator and an alcohol synthesis reactor to produce alcohols downstream from reforming chamber.

In certain embodiments, the reactor has the shape of plate-fins, wherein there is at least one oxidation chamber and at least one reforming chamber. The oxidation chamber comprises an inlet for oxidation reactant stream and the reforming chamber comprises an inlet for the reforming reactant stream.

In one aspect, the reactor comprises multiple oxidation and reforming chambers. The oxidation and reforming chamber are arranged in an alternate fashion such that the oxidation and reforming streams can be provided in alternate chambers.

In one aspect, the reactor is cylindrical and comprises an outer cylindrical chamber and inner cylindrical chamber. In one embodiment, the outer cylindrical chamber comprises the oxidation chamber and the inner cylindrical chamber comprises the reforming chamber. In another embodiment, the outer cylindrical chamber comprises the reforming chamber and the inner cylindrical chamber comprises the oxidation chamber.

The processes and the reactors provided herein reduce the cost associated catalyst loading while achieving high efficiency in reforming reaction. In one embodiment, the extended oxidation chamber improves the oxidation of the fuel by carrying out the oxidation reaction under adiabatic conditions. The catalyst costs are reduced by eliminating the reforming chamber adjacent to the extended oxidation chamber. In another embodiment, the catalyst costs are reduced by incorporating a catalyst and a no catalyst zone in the oxidation chamber. The reaction efficiency is improved by introducing the oxidation reactant stream in the oxidation chamber inlet at a pre-combustion temperature.

Although only exemplary embodiments are specifically illustrated and described herein, it will be appreciated that many modifications and variations of the process and apparatus described herein are possible in light of the above teachings and within the purview of the appended claims without departing from the spirit and intended scope of the claimed subject matter.

All publications and patent applications mentioned in this specification are herein incorporated by reference to the same extent as if each individual publication or patent application was specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A fuel reforming process for generating a synthesis gas comprising: flowing an oxidation reactant stream through an oxidation chamber and a reforming reactant stream through a reforming chamber, such that the oxidation reactant stream and the reforming reactant stream are counter-current to each other,
    a) wherein the oxidation chamber and the reforming chamber are separated by a thermally conductive surface;
    b) wherein the reforming chamber comprises: an inlet for the reforming reactant stream, an outlet for a reformed stream, and a reforming catalyst disposed on a plurality of heat exchange fins;
    c) wherein the oxidation chamber comprises: an inlet for the oxidation reactant stream, an outlet for an oxidation product stream, and an oxidation catalyst disposed on a plurality of heat exchange fins, wherein the outlet of the oxidation chamber is adjacent to the inlet of the reforming chamber and the inlet of the oxidation chamber extends beyond the outlet of the reforming chamber thereby constituting an extended oxidation chamber, and wherein the oxidation catalyst disposed on a plurality of heat exchange fins is in the extended oxidation chamber such that any heat exchange fins in the oxidation chamber beyond the extended segment do not contain catalyst coating; and
    d) wherein the heat exchange fins are brazed on the thermally conductive surface.

2. The process of claim 1, wherein the reforming reactant stream comprises water and methane.

3. The process of claim 1, wherein the oxidation reactant stream comprises fuel and oxygen.

4. The process of claim 1, further comprising preheating the oxidation reactant stream.

5. The process of claim 4, wherein the oxidation reactant stream is preheated to a temperature of from about 200° C. to about 300° C.

6. The process of claim 5, wherein the oxidation reactant stream is preheated to a temperature of from about 230 to about 260° C.

7. The process of claim 6 further comprising reacting the oxidation reactant stream in the extended oxidation chamber to generate heat.

8. The process of claim 7 further comprising transferring at least a part of the heat generated in the extended oxidation chamber to the oxidation reactant stream, thereby increasing the temperature of the oxidation reactant stream to a temperature of from about 800° C. to about 900° C.

9. The process of claim 8, further comprising transferring a substantial part of the heat generated in the oxidation chamber to the reforming reactant stream in the reforming chamber.

10. The process of claim 9, wherein the oxidation product stream exits the oxidation chamber at a temperature of from about 550 to about 750° C.

11. The process of claim 10, wherein the oxidation product stream exits the oxidation chamber at the temperature of from about 580 to about 620° C.

12. The process of claim 1, wherein the reforming reactant stream enters the reforming chamber at a temperature of from about 400 to about 600° C.

13. The process of claim 12, wherein the reforming reactant stream enters the reforming chamber at the temperature of from about 530 to about 560° C.

14. The process of claim 13, wherein the reformed stream exits the reforming chamber at a temperature of from about 700 to about 900° C.

15. The process of claim 13, wherein the reformed stream exits the reforming chamber at the temperature of from about 790 to about 810° C.

16. The process of claim 1 further comprising feeding the synthesis gas generated to a pressure swing unit to produce pure hydrogen.

17. The process of claim 1 further comprising feeding the synthesis gas generated to a membrane separator to produce pure hydrogen.

18. The process of claim 1 further comprising feeding the synthesis gas generated to a membrane separator to produce synthesis gas with a desired $H_2/CO$ ratio.

19. The process of claim 18, further comprising feeding the synthesis gas to a Fischer-Tropsch reactor to produce liquid hydrocarbons.

20. The process of claim 18, further comprising feeding the synthesis gas to an alcohol synthesis reactor to produce an alcohol.

21. The process of claim 1 further comprising feeding the synthesis gas generated to a Fischer-Tropsch reactor to produce liquid hydrocarbons.

22. The process of claim 1 further comprising feeding the synthesis gas generated to an alcohol synthesis reactor to produce alcohols.

23. A reactor for generating a synthesis gas by a fuel reforming reaction, the reactor comprising: an oxidation chamber and a reforming chamber separated by a thermally conductive surface, wherein
   a) the reforming chamber comprises: an inlet for a reforming reactant stream, an outlet for a reformed stream, and a reforming catalyst disposed on a plurality of heat exchange fins;
   b) the oxidation chamber comprises: an inlet for an oxidation reactant stream, an outlet for an oxidation product stream, and an oxidation catalyst disposed on a plurality of heat exchange fins, wherein the outlet of the oxidation chamber is adjacent to the inlet of the reforming chamber and the inlet of the oxidation chamber extends beyond the outlet of the reforming chamber thereby constituting an extended oxidation chamber, and wherein the oxidation catalyst disposed on a plurality of heat exchange fins is in the extended oxidation chamber such that any heat exchange fins in the oxidation chamber beyond the extended segment do not contain catalyst coating; and
   c) the heat exchange fins are brazed on the thermally conductive surface.

24. The reactor of claim 23, wherein the oxidation catalyst comprises palladium, platinum, copper or a combination thereof.

25. The reactor of claim 23, wherein the reforming catalyst comprises platinum, palladium, rhodium, ruthenium, iridium, nickel or a combination thereof.

26. The reactor of claim 23 further comprising a pressure swing adsorption unit downstream from the reforming chamber.

27. The reactor of claim 23 further comprising a membrane separator downstream from the reforming chamber.

28. The reactor of claim 27 further comprising a Fischer-Tropsch reactor downstream of the membrane separator.

29. The reactor of claim 27 further comprising an alcohol synthesis reactor downstream of the membrane separator.

30. The reactor of claim 23 further comprising a Fischer-Tropsch reactor downstream from the reforming chamber.

31. The reactor of claim 23 further comprising an alcohol synthesis reactor downstream from the reforming chamber.

32. The reactor of claim 23 further comprising multiple oxidation and reforming chambers arranged such that each oxidation chamber alternates with a reforming chamber.

33. A cylindrical reactor for generating a synthesis gas comprising an outer cylindrical chamber and an inner chamber, wherein
   a) the outer chamber and the inner chamber are separated by a thermally conductive surface;
   b) the inner chamber comprises: an inlet for a reforming reactant stream, an outlet for a reformed stream, and a reforming catalyst disposed on a plurality of heat exchange fins;
   c) the outer chamber comprises: an inlet for an oxidation reactant stream, an outlet for an oxidation product stream, wherein the outlet of the outer chamber is adjacent to the inlet of the inner chamber and the inlet of the outer chamber extends beyond the outlet of the inner chamber thereby constituting an extended outer chamber, and wherein the oxidation catalyst disposed on a plurality of heat exchange fins is in the extended oxidation chamber such that any heat exchange fins in the oxidation chamber beyond the extended segment do not contain catalyst coating; and
   d) the heat exchange fins are brazed on the thermally conductive surface.

* * * * *